United States Patent [19]
Touch et al.

[11] Patent Number: 5,353,419
[45] Date of Patent: Oct. 4, 1994

[54] MEMORY-SIDE DRIVEN ANTICIPATORY INSTRUCTION TRANSFER INTERFACE WITH PROCESSOR-SIDE INSTRUCTION SELECTION

[75] Inventors: Joseph D. Touch, Willingboro, N.J.; David J. Farber, Landenberg, Pa.

[73] Assignee: Trustees of the University of Pennsylvania, Philadelphia, Pa.

[21] Appl. No.: 819,100

[22] Filed: Jan. 9, 1992

[51] Int. Cl.5 .......................... G06F 9/00; G06F 9/30
[52] U.S. Cl. ................... 395/375; 364/261.3; 364/261.5; 364/261.7; 364/263.1; 364/DIG. 1
[58] Field of Search ............... 395/375, 400, 425, 775, 395/800

[56] References Cited

U.S. PATENT DOCUMENTS

| | | | |
|---|---|---|---|
| 4,722,050 | 1/1988 | Lee et al. | 395/375 |
| 4,742,466 | 5/1988 | Ochiai et al. | 395/375 |
| 4,777,594 | 10/1988 | Jones et al. | 395/375 |
| 4,920,538 | 4/1990 | Chan et al. | 371/19 |
| 5,027,270 | 6/1991 | Riodan et al. | 395/425 |
| 5,050,068 | 9/1991 | Dollas et al. | 395/375 |
| 5,081,574 | 1/1992 | Larson et al. | 395/375 |
| 5,165,025 | 11/1992 | Lass | 395/375 |
| 5,230,068 | 7/1993 | Van Dyke et al. | 395/375 |

OTHER PUBLICATIONS

"A Distributed Logic Program Instruction Prefetching Scheme", Wolfgang A. Harlang, *Microprocessing and Computing*, 1987, pp. 407–415.
"The IBM System 1360 Model 91: Machine Philosophy and Instruction-Handling", D. W. Anderson et al., *IBM Journal*, Jan. 1967, pp. 8–24.
"Efficient Hardware for Multi-Way, Jumps and Pre--Fetches", K. Karplus et al., *IEEE Micro*, vol. 18, 1985, pp. 11–18.
Specification Document for F8 Microcomputer System, May 1976, pp. 1-1 to 1-20.
"The Case for the Sustained Performance Computer Architecture", A. Dollas et al., *Computer Architecture News*, vol. 17, No. 6, Dec. 1989, pp. 129–136.
"The Evolution of Instruction Sequencing", R. Kriek et al., *Computer*, vol. 24, No. 4, 1991, pp. 5–15.
"The Inhibition of Potential Parallelism by Conditional Jumps", E. M. Riseman et al., *IEEE Trans. on Computers*, 1972, pp. 1405–1411.
"Decoupled Access/Execute Computer Architectures", J. E. Smith, *ACM Trans. on Computer Systems*, vol. 2, No. 4, Nov. 1984, pp. 289–308.
"Code Generation for Stearing Access/Execute Mechanism," M. E. Benitez et al., ACM 0-89791-38-0-9/91/0003-0132, Sep. 1991, pp. 132–141.
"SIMP (Single Instruction Stream Multiple Instruction Pipelining): A Novel High-Speed Single-Processor Architecture", K. Murakanii et al., ACM 0884-7495/89/0000/0078, 1989, pp. 78–85.
"Mirage: A Model for Ultra–High–Speed Protocol Analysis and Design," J. D. Touch et al., Proc. *IFIP WG 6.1/WG 6.4 Workshop on Protocols for High–Speed Networks*, May. 1989, pp. 1–10.

*Primary Examiner*—Alyssa H. Bowler
*Assistant Examiner*—Alpesh M. Shah
*Attorney, Agent, or Firm*—Ratner & Prestia

[57] ABSTRACT

A computer architecture which significantly reduces latency in fetching instructions from main memory includes a code-pump located proximate to the memory and a filter cache located proximate to the processor. The code pump reduces latency in fetching instructions by predicting possible instruction streams that may be executed by the processor and passing instructions from all possible streams to the filter cache. The code pump fetches instructions from the memory and partially decodes the instructions to determine their types. Instruction types which may change the flow of the program such as subroutine calls and conditional branches, cause the code pump to concurrently supply instructions from all flow paths that can be predicted from these instructions. To keep track of the possible flow paths, the code pump maintains a data structure which is a combination of multiple stack entries (for call instructions) and tree entries (for branch instructions). The filter cache passes the addresses of fetched instructions back to the code pump. The code pump uses these addresses to determine which flow paths were followed and to deallocate any entries in the data structure which correspond to paths that were not followed.

12 Claims, 6 Drawing Sheets

MEMORY-SIDE DRIVEN ANTICIPATORY INSTRUCTION TRANSFER INTERFACE WITH PROCESSOR-SIDE INSTRUCTION SELECTION

FIELD OF THE INVENTION

This invention relates generally techniques for retrieving program code from memory and particularly to techniques for compensating for transmission latency between the central processing unit and the memory.

BACKGROUND OF THE INVENTION

Cache memory systems have been designed to mitigate the access speed limitation of main storage by providing rapid access to instructions or data which are likely to be used during a relatively short time interval. Caches are used to reduce access latency and to reduce memory bandwidth requirements. The discussion that follows is primarily concerned with reducing access latency.

The available cache memory systems generally rely on empirically observed phenomena known as the spatial locality of reference and temporal locality of reference to determine which instructions to transfer from memory to cache before the instructions are actually referenced. These two phenomena refer to the tendency of a program, during any relatively small time interval, to access data or instructions which have addresses in the main storage that differ by a relatively small value. Stated another way, these properties hold that when a specific target instruction or datum is used by the processor, it is likely that the immediately adjacent instructions or data in the address space of main memory will be used close in time to the use of the target.

Transfers from memory to cache are made more efficient by fetching segments of instructions or data rather than single target instructions of data values. Up to a limit defined by the size and access speed of the cache, the larger the segment fetched, the greater is the likelihood that the next reference to the cache memory will succeed.

The efficiency of any cache memory system can be improved by reducing the cache miss rate. In some existing systems relatively elaborate methods have been developed to ensure that most program words and data values will be available in cache memory to satisfy the access requests of the central processing unit (CPU). For example, the IBM 360 model 91 computer was designed to fetch instructions before they were requested by the central processing unit (CPU). The system was designed to prefetch (and store in a buffer) up to 16 contiguous instructions ahead of the instruction being executed by the CPU. The system included special features for handling conditional branch instructions. Instructions of this type transfer control to one of two instruction streams based on the value of a condition determined at run time. The referenced computer system monitored the instruction stream for branch instructions. If one was encountered, the system would prefetch up to 16 instructions ahead on the not-taken path, plus the first four instructions on the branch-taken path. All of these instructions were stored in the program buffer. Any instructions which were not used were overwritten as buffer space was required.

A number of systems have employed look ahead mechanisms based on information extracted at compile time. Software based systems are embodied in compilers which generate code sequences that initiate prefetching of instructions, without a priori knowledge of the paths which are actually executed. Sequences of anticipatory program access requests are then communicated from the CPU to the memory at run time, when these prefetch instructions are executed.

With the advent of distributed computing over communications networks, the CPU and the cache are often separated from the main memory by a path which has a high bandwidth and, at the same time, a high latency. Such a configuration is typical in a campus or industry environment in which programs are stored in main memory in a server or other central computer system. The central computer provides program code to client CPUs, which execute the instructions. These client CPUs may be located as much as one kilometer away from the central computer.

Although communications technology improvements have resulted in continuing improvements in the data transfer rate as measured in bits per second, the actual latency time for a specific bit to travel from the server to the client is primarily determined by the physical distance and the propagation speed of the signal (e.g., the speed of light for a fiber optic connection, and lower speeds for electrically conductive media). The total latency is at least the sum of the propagation delay plus the period of a single word transmission (i.e., word size divided by the reciprocal of the network bit rate). As the network bit rate increases, the total latency approaches its lowest possible value determined by the propagation delay.

A number of systems have employed logic in the memory to proactively transmit instructions to the CPU, in order to reduce access latency. One of the earlier forms of program memory with such logic was the Fairchild F8 microcomputer system. The F8 provided memory addressing logic in Program Storage Units (PSUs), separated from the CPU. The PSU included a program counter and an address stack. For normal sequentially executed instructions, the PSU provided the next instruction to the CPU proactively. Additionally, a single level of program stack was implemented in the PSU, to allow the CPU to respond immediately to an interrupt and then return to the main program with minimal penalty.

Another prefetching system with logic in the memory is described in a paper by W. A. Halang, entitled, *A Distributed Logic Program Instruction Prefetching Scheme*, Microprocessing and Microprogramming vol. 19, 1987, pp. 407–415 which is hereby incorporated by reference for its teachings on computer system design. The logic in Halang's Program Storage Module (PSM) enables program memories to provide the CPU with sequential and non-sequential instruction streams, and to perform prefetching along two paths in anticipation of a single conditional branch instruction. Each instruction provided by the PSM to the CPU includes a flag bit which identifies whether the instruction belongs to the branch-taken path or the branch-not-taken path. The instructions accumulate in a dual buffer in the CPU, which executes instructions from one side of the buffer at a time. When a branch instruction is executed, the CPU switches to the indicated buffer (i.e. taken or not-taken) and clears the contents of the other buffer. The PSM is eventually notified of this selection and the unused instructions are discarded.

Other systems have sought to utilize compiler generated sequences through hardware mechanisms to overcome the penalty incurred by the software based prefetch systems when instruction access requests are communicated at run time. One such system is described in a paper by A. Dollas and R. F. Krick entitled, *The Case for the Sustained Performance Computer Architecture*, Computer Architecture News, Vol 17, No. 6, December 1989, pp 129-136 which is hereby incorporated by reference for its teachings on computer systems design. This paper discusses a system in which multiple Instruction Decode Units (IDU) are provided, each capable of managing a stream of instructions. The IDU's are each capable of prefetching sequential instructions and jumps. A stack in each IDU adds the capability to anticipate recursive code or nested code that may lead to multiple calls of a single function. A single program execution controller guides the distribution of instructions from the memory to the IDUs.

In recent years, access/execute computer architectures have been employed to overcome the memory access latency problems in systems such as the IBM RS/6000 and the Intel i860. The main feature in these architectures is the high degree of decoupling between operand access and instruction execution. Separate, specialized processors are provided for each. The access unit processor performs all address computation and performs all memory read requests. Communications between the access unit and the execution unit are accomplished via shared queues, rather than through memory. Many conditional branch instructions are handled by the access unit processor, allowing it to run ahead of the execution unit processor to fetch instructions before they are referenced.

SUMMARY OF THE INVENTION

The present invention is embodied in a computer system which includes an instruction preprocessor located in proximity to the program memory. The preprocessor fetches and partially decodes instructions from the program memory and passes the instructions on to the CPU. When the preprocessor encounters instructions which may change program flow, it anticipates the change by providing instructions from along all paths which can be determined. The preprocessor is coupled to receive addresses of executed instructions from the CPU to determine which paths were chosen and to discontinue providing instructions from paths which were not chosen.

According to one aspect of the invention, the system also includes a small cache memory located in close proximity to the CPU through which the CPU accesses instructions received from the preprocessor.

According to another aspect of the invention, the preprocessor maintains a data structure including at least call and branch instructions which describes the possible control flow paths for instructions being applied to the CPU.

According to another aspect of the invention, the data structure is composed of intertwined tree and stack substructures.

According to yet another aspect of the invention, the system includes apparatus which modifies the data structure based on the instruction addresses received from the CPU to eliminate control flow paths which were not followed by the CPU.

DETAILED DESCRIPTION

Overview

Prior cache memory systems did not support generalized prefetching of streams of instructions which included jumps, calls and returns, with multiple levels of nesting and recursion, and multiple conditional branch instructions.

The present invention is embodied in an architecture, in which a Code Pump 20, co-resident with memory, anticipates instructions which the CPU 2 may require. The Code Pump 20 transmits the instructions to a Filter Cache 10, co-resident with the CPU, prior to any references to the instructions by the CPU. The Code Pump 20 actually transmits some instructions that the CPU 2 does not need. The Filter Cache 10 discards all instructions received except for the instruction most recently referenced by the CPU 2, based on the updated program execution status at the time the instructions are received at the Filter Cache. The CPU 2 directs the code pump by continually sending it the address of the most recently referenced instruction.

The Code Pump 20 comprises three main components. The first of these is a Treestack 26 which contains an image of the possible program execution paths in the CPU 2. The image in the Treestack 26 includes both conditional branch instructions (the tree-like attribute) and calls and returns (the stack-like attribute) in any valid sequence that the CPU 2 can execute.

The second component is the Direct Memory Access (DMA)/Diverger 24. The DMA/Diverger 24 manages the preparation and transmission of messages (which include all instructions the CPU 2 may execute) to the Filter Cache 10. The DMA/Diverger 24 also manages the addition of elements in the Treestack 26. These elements represent instructions which the Code Pump 20 anticipates will be used by the CPU 2.

The third component is the Converger 22. The Converger 22 manages the removal of elements from the Treestack 26 in response to notification of instructions recently referenced by the CPU 2. The removed elements represent instructions which have already been used by the CPU 2, or correspond to branch-not-taken paths, so that the Code Pump 20 need not send or resend them to the CPU 2.

The exemplary Filter Cache 10 contains a one element flow-through cache storage 12 for instructions which are passed on to the CPU 2. It also includes a buffer 16 for incoming instructions sent by the Code Pump 20, and logic 14 to compare the address of the incoming instructions from the Code Pump 20 with the address of the instruction referenced by the CPU 2. An incoming instruction is only stored in the buffer 16 if its address matches the referenced address. All other instructions are 'filtered' out.

This architecture is designed to overcome problems encountered when there is high latency due to physical separation between the program memory and the CPU. The exemplary architecture is aimed at configurations in which the propagation delay is two or more orders of magnitude greater than the CPU cycle time. In these circumstances, there is a high cache miss penalty if the CPU references an instruction not present in the cache.

DETAILED DESCRIPTION OF THE EXEMPLARY EMBODIMENT

The following is a description of an exemplary cache system in accordance with the present invention. This system is based on a generalized communications model known as Mirage. This communications model as described in a paper by J. D. Touch and D. J. Farber entitled *MIRAGE: A Model for Ultra-High-Speed Protocol Analysis and Design* Proc. of the IFIP WG 6.1/WG 6.4 Workshop on Protocols for High-Speed Networks, Zurich, Switzerland, May 9–11, 1989 which is hereby incorporated by reference for its teachings on high-speed protocols. Mirage is a model for the design and analysis of high-speed wide-area network protocols. It models inter-node and intra-node communications needed to maintain a shared state among the remote nodes.

The latency of the communications link increases the uncertainty with which each node can determine the state of the other node. The local node maintains a model of each remote node and sends messages to respond to each possible state at the remote node. The remote node accepts only the messages which correspond to its actual state, and replies to the local node. The messages received by the local node narrow down the possible set of states of the remote node, and allow the local node to update its image of the remote node, and reduce the set of states.

Figure 1:
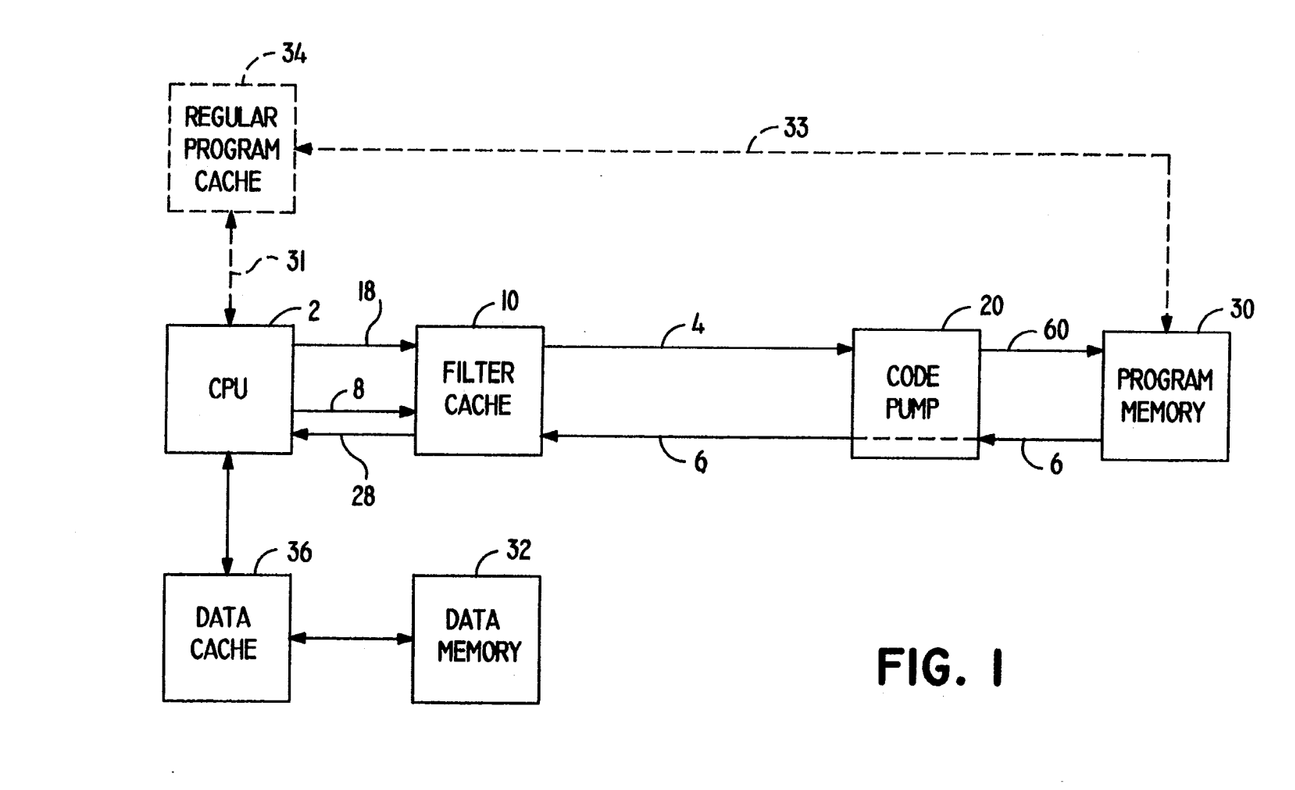
FIG. 1 is a block diagram of a system utilizing the present invention.

FIG. 1 shows a system and method of communications in accordance with the present invention. A Harvard style architecture is used, in which program memory 30 is separate from data memory 32. Central Processing Unit (CPU) 2 communicates with a remote program memory 30. An exemplary use for such a configuration is that of a client CPU 2 executing software instructions which are stored remotely in a memory 30 on a server. The client uses data stored locally ill memory 32. A Filter Cache 10 is located at the site of the CPU 2 and a Code Pump 20 is located remotely, with main memory 30.

A low latency path 18 is provided between CPU 2 and Filter Cache 10. The communications paths, 4 and 6, between the Filter Cache 10 and the Code Pump 20 have a high latency, however, due to the propagation delay resulting from the physical distance between the two units. This latency is measured in terms of the number of instructions which the CPU 2 can execute during the propagation time for an instruction request to be sent from the CPU 2 to the memory 30. The present invention is most advantageous for systems in which the bit rate of the links 4 and 6 are high and the latency is two or more orders of magnitude longer than the execution time for an instruction (e.g., a high speed wide area network). The cache miss penalty for such a system is very high.

In many existing systems, the CPU 2 communicates with a program cache memory 34 (shown in phantom) via a high speed, low latency path 31. The cache 34 replies quickly to a request for an instruction in the case of a cache hit, or issues a request to memory 30, via a high latency path 33, in the case of a cache miss. The program word requested from memory 30 and a group of adjacent words are forwarded back to CPU 2 by the memory and is stored in cache 34 for later use. These existing systems also include extensions to this architecture which support prefetching. In prefetching systems, the cache 34 requests instructions in anticipation of their use by the CPU 2.

Using the present invention, the memory 30 anticipates all possible needs of the CPU 2 which can be predicted. A Code Pump 20 manages the anticipation at the site of the memory and a Filter Cache 10 emulates the function of a conventional cache 34. Since the code pump is providing almost all of the instructions that the CPU 2 will need, the CPU will almost always find the instruction in the Filter Cache (i.e. hit in the cache). Thus, the system appears to the CPU 2 as though the Filter Cache were a conventional cache and there were no Code Pump 20.

A prior art architecture with a cache incurs a round trip latency delay (the cache miss penalty) whenever a miss occurs. Prior art cache systems with prefetching periodically request blocks of code in advance, to increase the cache hit ratio. To maintain a high cache hit ratio, however, these systems may need to use a relatively large cache memory.

The present invention is a self-adapting version of prefetching in which the Code Pump 20, closely coupled to the memory, looks ahead at successive instructions to determine which instructions may be executed and sends these instructions to the processor 2. Where multiple instruction streams are possible (e.g., where there is a conditional branch instruction) the Code Pump 20 sends both instruction streams to the CPU 2 until it receives a state update message from CPU 2 identifying which path is actually taken.

Because this method of anticipation results in the transmission of some instructions which are not actually required by CPU 2, the Filter Cache only passes on the instructions that are requested by the CPU 2. This method results in an increase in the volume of instruction traffic over the communications link 28, which is the rationale for applying the present invention in high bit rate networks.

Filter Cache 10 differs in function from conventional program cache 34. The conventional cache 34 stores instructions as they are fetched from memory for later use by the CPU 2. It contains instructions which have already been used. The Filter Cache 10, on the other hand, receives instructions from the Code Pump 20 before they are referenced by the CPU 2. In the exemplary embodiment of the invention, the Filter Cache does not retain the instructions after it passes them on to the CPU. In some applications, it may be desirable to include both the Filter Cache 10 and a conventional program cache 34 in the system to make instructions available in low latency memory whether or not they have been previously been executed. In the described embodiment of the invention, however, the program cache 34 is omitted.

The communications model on which the system is based models the possible execution states of the CPU 2. In particular, the Code Pump 20 maintains a model of the execution state of the CPU 2. The goal of the system is to provide the Code Pump 20 with enough information regarding the execution state of the CPU 2 to allow the Code Pump 20 to proactively provide instructions to CPU 2 before they are requested, thus reducing the number of cache misses. The CPU 2 provides its execution state, as defined by the Program Counter (PC) for the address of the next instruction to be referenced, to the Code Pump 20.

Due to the communications latency, the Code Pump 20 always receives an "old" execution state. For example, if the latency is one hundred times the instruction execution time, the CPU 2 may be executing the 101st instruction by the time the Code Pump 20 receives the program counter value for the first instruction. The PC set of CPU 2 is the set of possible instructions that the CPU may execute, given that the program counter value the Code Pump 20 has just received is out of sync by the latency of the link. This PC set comprises a subset of the complete set of instructions in memory 30.

The size of the PC set is affected by the passage of time, and the transmission and receipt of messages by the Code Pump 20. The passage of time generally results in an increase in the size of the PC set, due to reduced certainty as to the current state of the CPU 2. Likewise, the transmission of messages (instructions) from the Code Pump 20 to the CPU 2 increase the size of the PC set, since new paths may be provided, and there is potential for the message to be received late or lost. Receipt of messages by the Code Pump 20 reduces the size of the PC set. The received message may provide an indication of whether conditional branch instructions or pending subroutine return instructions have been executed. These messages allow the code pump to remove paths which have completed and paths which were not taken from the PC set which defines the model of the CPU execution state. The PC set is then propagated forward again to reflect new potential states and to provide new instructions to the CPU 2.

Figure 2:
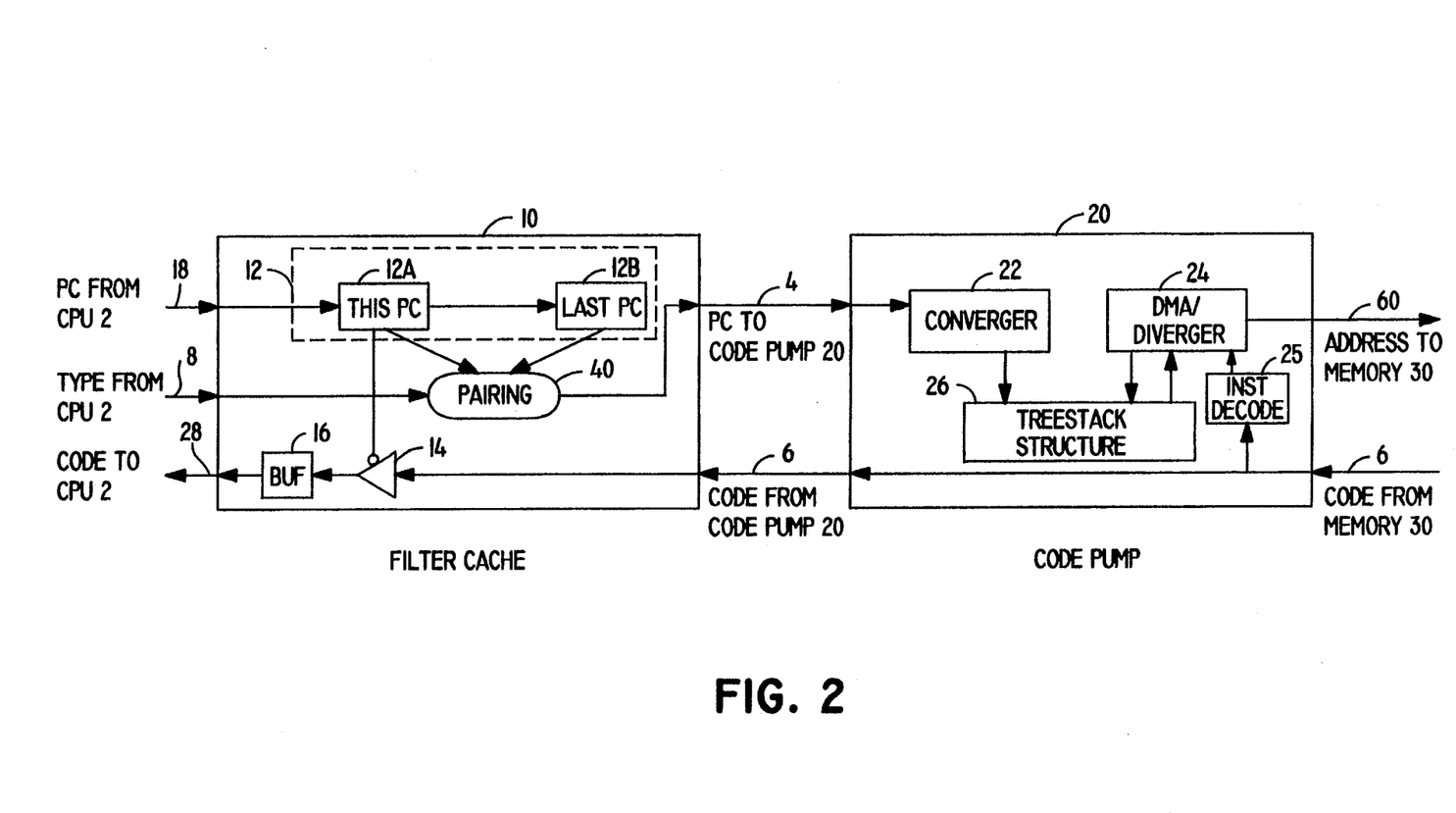
FIG. 2 is a block diagram showing the components of the Filter Cache and Code Pump shown in FIG. 1.

Table 1 shows the different types of instructions, as distinguished from one another by their impact on the size of the PC set. When the Code Pump 20 sends an instruction to the CPU 2, the PC set becomes the union of the PC set before the message, plus the new states added by the message. In the exemplary embodiment of the invention, the Code Pump 20 provides one instruction for each PC value which is active in the Treestack 26.

TABLE 1

Instruction Types and Accompanying PC Set Transformation

| Instruction | Transform PC —> | Basis for New PC Values |
|---|---|---|
| regular | PC + 1 | PC |
| jump | PC' | PC, instruction |
| call | PC' | PC, instruction (prior PC is stored in a known structure in RAM) |
| branch | {PC + 1, PC'} | PC, instruction |
| return | PC' | stored in a known structure in RAM (previously saved) |
| indirect | {all PCs} | PC, instruction, any CPU register, program or data memory value. |

The simplest case is the regular instruction, which causes the program counter to increment by one. In this case, the resulting set of possible PCs is changed by replacing the value PC by the value PC+1. At the same time, the regular instruction which produced the transformation is passed on to the CPU 2.

Jump instructions transfer control (i.e., modify the program counter) unconditionally. In the case of a jump, the program counter becomes a new value, PC', by the addition of a constant (called the 'offset') to the current PC value, or by specifying the new value for the program counter within the instruction (a direct jump). In the exemplary embodiment of the invention, all jump instructions are assumed to add an offset to the current PC value in order to obtain the new value, PC'.

A call instruction is similar to a jump instruction, in that it causes an unconditional transfer of control to a known destination, changing the PC value to PC'. The difference between the call and jump instructions is that when the call is executed, the existing current state is retained in the Treestack and the PC' value is added to the Treestack as a new leaf using a Push operation. The call instruction causes the system to transfer control to a set of instructions which includes a return instruction. Responsive to the return instruction, the system, as described below with reference to FIG. 5, uses the retained local state to return control back to the instruction just after the program address of the corresponding call instruction.

In the case of a conditional branch instruction, the PC space transformations are dependent on the state of the processor. The PC is changed to a value which depends on whether the branch is taken. In a typical conditional branch operation, an expression or condition is evaluated by the CPU 2. If the condition is false (zero), the PC is incremented by one. If the condition is true (non-zero), the PC is assigned a new value indicated by the destination of the executed branch instruction. Because the there are two possible new PC values, the conditional branch expands the set of PCs.

In the case of an indirect instruction, the PC change is based on the contents of a CPU register or a data or memory value. For these instructions, the PC set expands to include all instructions in memory. These indirect instructions may be jumps, calls or branches. For indirect instructions, it is impractical to send code in anticipation of future reference by the CPU 2. Fortunately, these indirect instructions account for a very small fraction of the instructions in most programs, typically less than one percent. Because of the large uncertainty of the CPU state caused by an in indirect instruction, these instructions are not anticipated in this embodiment of invention. When an instruction of this type is encountered, its corresponding PC value in the treestack is marked as inactive and the Code Pump stops providing instructions for the corresponding branch of the tree.

In a conventional processor/memory architecture, there is no need to label the instructions which are sent from memory 30, since only one memory request is outstanding per unit time. Prefetching caches typically do label the instructions so that the CPU can request the instructions by their addresses.

In the exemplary embodiment of the present invention, instructions sent from memory are labeled with their addresses, so that the Filter Cache 10 can identify instructions which were requested by the CPU 2 by their labels, pass these instructions to the CPU and discard the unreferenced instructions. For example, if the image of the state of the CPU 2 maintained by the Code Pump 20 includes a conditional branch instruction, there are at least two active values in the PC set. In response to these values, the Code Pump 20, sends two interleaved instruction streams to the CPU 2. Each instruction is labelled using the PC value which was sent to the memory 30 to fetch the instruction.

Referring to FIG. 2, Filter Cache 10 stores the addresses of the instruction requested by the CPU 2 and the last previously requested instruction address in a two-stage shift register 12. These addresses are the current and prior PC values in registers 12a and 12b, respectively. The Filter Cache 10 stores instructions coming in from memory in buffer 16. Logic 14 compares the addresses in registers 12a and 16 and provides CPU 2 only the instruction whose PC value matches the most recently requested address. All other instructions, for addresses not requested, are discarded.

The exemplary Filter Cache 10 has a relatively small buffer 16. In the exemplary embodiment, CPU 2 is a Reduced Instruction Set (RISC) Computer in which the length of time to execute any instruction is the same. In the exemplary RISC computer system, all jump, branch and call instructions modify the current PC value by adding a fixed offset.

Code Pump 20 can provide instructions to the Filter Cache 10 at the same rate at which they are executed by CPU 2. The Filter Cache 10 performs the comparison and immediately passes on the requested instruction to CPU 2. There is no queueing-up of instructions in register 16. Therefore register 16 need only provide storage for one instruction and its address.

As long as the Code Pump 20 can provide instructions to the CPU 2 at a rate which is not greater than the rate at which the CPU can execute the instructions, a single instruction code buffer is sufficient. If, however, the rate at which the Code Pump 20 provides instructions may exceed the rate at which the instructions can be executed, a larger buffer 16 may be desirable. Since the Filter Cache 10 can remove unreferenced instructions at a rate greater than the CPU 2 can request new instructions, the buffer size may be increased only slightly to accommodate minor variations in processor speed. The exemplary embodiment of the invention assumes that the Code Pump 20 can provide referenced instructions to the CPU 2 at a rate no greater than the CPU can execute the instructions.

The Filter Cache 10 sends messages to Code Pump 20 providing information to the Code Pump regarding the execution state of CPU 2. Logic within the DMA/-Diverger 24 in Code Pump 20, using the instruction decoder 25, manages the identification and transfer of instructions which following regular, jump, call, return or branch instructions, without any Filter Cache messages. When the Code Pump 20 encounters an indirect instruction, it deactivates the corresponding PC value in the PC set. This PC value can only be reactivated by a message from the Filter Cache 10 provided after the CPU 2 has executed the indirect instruction. This is the only case in which a cache miss should occur in the Filter Cache 10.

In this instance, the messages sent from Filter Cache 10 to Code Pump 20 identify the type of instruction (indirect), the current PC value from register 12a, and the prior PC value from register 12b. The PC value in register 12b is the address (PC value) of the indirect instruction, and the PC in register 12a is the next instruction the CPU 2 executes after the indirect instruction. The Code Pump 20 uses the address pair 12a, 12b to update its image of the PC set in the Treestack structure 26 as described below with reference to FIG. 6.

The Filter Cache 10 also sends messages to Code Pump 20 when a branch instruction is executed. The Code Pump is able to continue transferring instructions from both paths following a branch instruction, without these messages, so no cache miss occurs in Filter Cache 10. The Code Pump 20 still uses these messages, however, to update its image of the PC set in the Treestack structure 26. The message includes the instruction type (branch) and the PC of the first instruction in the path-taken by the branch instruction. Once the branch selection is known by the Code Pump 20, it can stop transmitting instructions from the path-not-taken. This reduces the volume of instruction traffic on the network.

The Code Pump 20 manages the image of the CPU 2 (i.e., the set of program counters in the PC set) using the Treestack data structure 26.

The Treestack 26 stores the image of the execution state of the CPU 2 which is maintained by the Code Pump 20. The Treestack 26 includes two types of elements: unary elements 120 shown in FIG. 3a, and binary elements 122 shown in FIG. 3b.

Figure 3A:
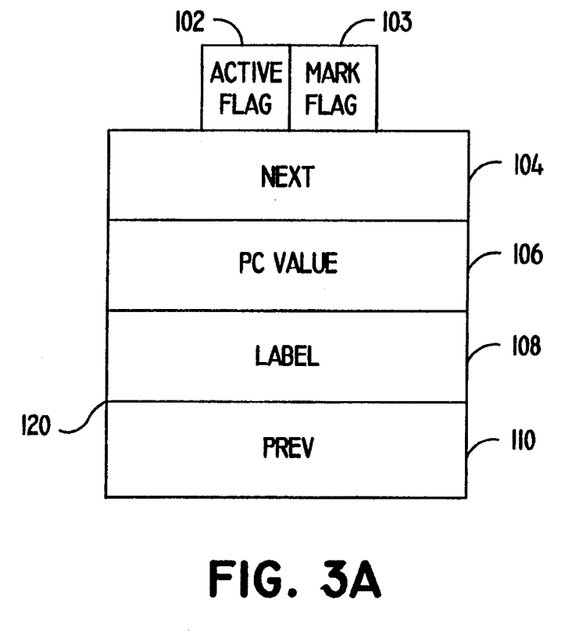
FIGS. 3a and 3b show the memory elements which are used to store program counter values in the Treestack structure shown in FIG. 2.

The unary element 120 in FIG. 3a includes a current PC value 106, previous PC 110 and next PC 104 values, a label 108, a flag-bit 102 and a mark-bit 103. The unary element 120 is used to model regular instruction PC incrementing, jump instructions, subroutine calls and returns and recursion. This is the stack attribute in the Treestack 26.

Figure 3B:
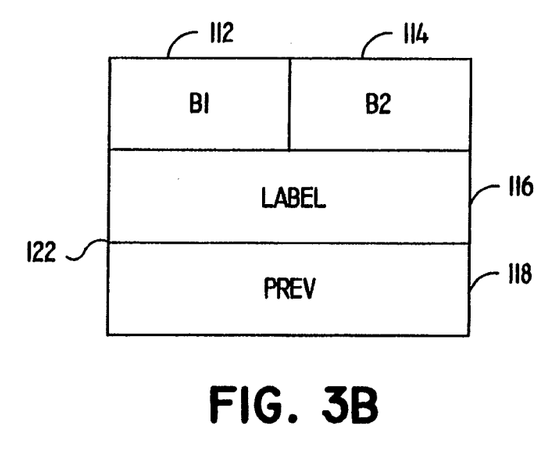

The binary element 122 in FIG. 3b includes a previous PC value 118, a label, 116, and two branch destination values 112, 114. The binary element is used to model conditional branching (the tree attribute) in the Treestack.

Figure 4:
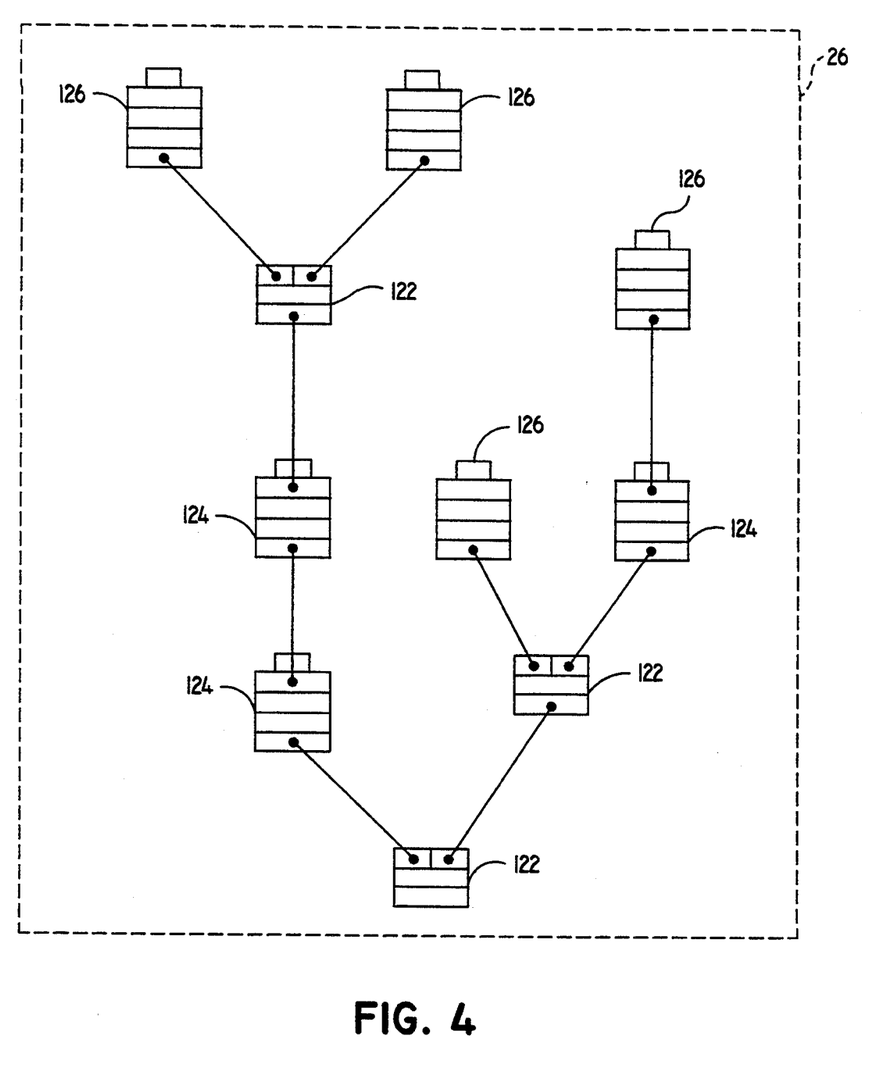
FIG. 4 shows how the memory elements shown in FIGS. 3a and 3b are combined in the Treestack structure shown in FIG. 2.

FIG. 4 shows an exemplary arrangement of unary elements 120 and binary elements 122 in a Treestack 26. The unary elements 120 may be leaves 126 or internal unary elements 124.

A leaf 126 is a unary element 120 with an empty "next PC" pointer 104. A leaf 126 may be active (Flag 102 is set) or inactive (Flag 102 is reset). Active leaves specify the current active members of the PC set, that is to say, those program counter values which the code pump will use to send instructions to the Filter Cache 10. The leaf 126 includes a PC value 106, which changes when instructions are transferred, and a label 108, which retains the PC value assigned to the leaf at its creation. Each time a PC value 106 is incremented, it identifies the address of the next instruction to be transferred to the CPU 2. An inactive leaf 126 represents a pending indirect instruction, which cannot be modelled; i.e., the PC of the instruction following an inactive leaf cannot be identified before the indirect instruction is executed.

An internal unary element 124 has a PC value in its "next PC" pointer 104. An internal unary element 124 is, by definition, inactive (Flag 102 is reset). The "next PC" pointer 104 of an internal unary element 124 is used to identify the PC of the entry point of a called subroutine. The nesting of multiple levels of subroutine calls is represented by a linear stack of unary elements. All of the outer levels of nesting are represented by internal unary elements 124, with the outermost levels of nesting at the bottom of the stack. The innermost levels of nesting are represented by the leaves 126 at the top of the stacks.

If a subroutine is being modelled, the "previous PC" value 110 in a unary element 120 (whether a leaf 126 or an internal unary element 124) identifies the address of the calling instruction while the PC value 106 represents the address of the most recent instruction passed to the Cache Filter 10 from this branch of the Treestack 26. Upon encountering a return instruction, the Code Pump 20 transfers the return and then transfers the instructions in the calling routine, beginning at the address following the "previous PC" value 110.

Binary elements 122 include a label 116 which identifies the address of the corresponding conditional branch instruction. The first branch destination value 112 in a binary element 122 is the PC value for the instruction following the branch instruction (i.e. the branch-not-taken path). The second branch destination value 114 is the sum of the label PC 116 plus the offset (i.e. the branch-taken-path). The "previous PC" value 118 in a binary element is the address of the next instruction closer to the root of the tree for this branch. If the binary element grew from another binary element, this is the address of the corresponding branch instruction for the other binary element. If the binary element is generated from the first branch instruction in a subroutine then it replaces the unary element for the subroutine call and, so, the "previous PC" value contains the address of the call instruction. The first binary element 122 in the main routine has no "previous PC" value 118.

The previous PC values 110 and next PC values 104 in the unary elements 120, and the previous PC values 118 and destination PC values 112, 114 in the binary element create the ordering of elements to form the Treestack 26. For any given element, the previous PC value 110 or 118 defines the path to the root of the tree and the next PC values 104 and destination PC values 112, 114 define the superior tree, which is the term used to describe the path from an element to the leaves which grew from that element.

The size of the Treestack affects the hit ratio of the Filter Cache 10, in a way similar to the way in which the size of a conventional cache affects its hit ratio. Ideally, the Treestack should be able accommodate enough unary and binary elements to model as many instructions as are necessary to keep the CPU 2 from missing in the Filter Cache 10. In the exemplary embodiment, this size is at least 100 elements. Since the Treestack 26 must maintain a model of all of the possible states the processor can occupy during the latency period, the desired size for the Treestack increases for systems with longer latency.

If the number of available entries in the Treestack 26 ever drops to zero, the system stops the code pump until entries are made available by the action of the Converger 22.

As described above, the DMA/Diverger 24 controls how the Treestack 26 grows to model the possible current and future states of the CPU while the Converger 22, responsive to state-indicating messages received from the CPU 2, prunes the Treestack, eliminating possible states that were not achieved. Both the DMA/Diverger 24 and the Converger 22 are implemented as state machines, each having a defined set of states and a set of transition rules for moving between states. These components are readily implemented using programmable logic arrays and sequential elements. The operation of these state machines is described below with reference to flow-chart diagrams shown in FIGS. 5 and 6.

Figure 5:
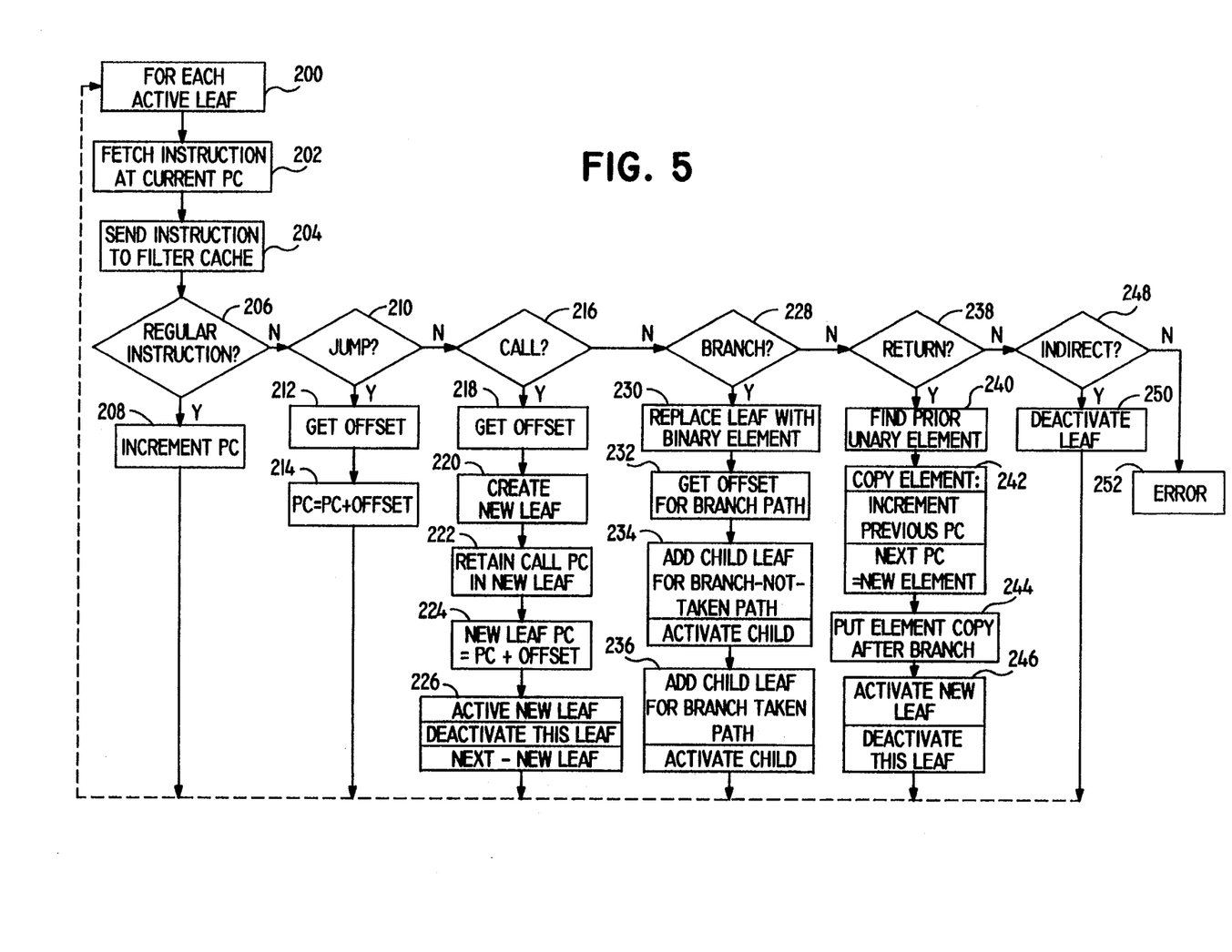
FIG. 5 is a flow diagram showing the functions performed by the DMA/Diverger shown in FIG. 2.

DMA/Diverger 24 performs two functions. The first is the direct memory access. The DMA fetches instructions from memory 30 and transmits them to the Filter Cache 10. The second function is the maintenance of the Treestack structure 26, which is used to anticipate the instructions that the CPU 2 will need. FIG. 5 is a flow-chart diagram which illustrates these DMA/Diverger 24 functions. As shown in step 200, the DMA/Diverger 24 performs its function for every active leaf 126 in the Treestack 126. At step 202, DMA/Diverger 24 fetches the instruction stored at the address indicated by the PC value 106 in each active leaf. The instruction is transferred, at step 204, to the Filter Cache 10 along with its address.

At step 206, the DMA/Diverger 24, using the partial instruction decoder 25, is ready to determine the PC 106 of the next instruction to be sent to the Filter Cache 10 for each active leaf 126. Logic within the DMA/Diverger associates with each instruction type, except indirect instructions, a rule for selecting the PC of the next instruction.

At step 206, if the decoder 25 indicates that the instruction passed to the Filter cache 10 is a regular instruction, the DMA/Diverger 24 simply increments the PC value 106 by one. At step 210, a Jump instruction is handled in a similar fashion. The PC offset specified within the jump instruction is added to the PC value 106 in the active node to generate a new PC value. At step 212, DMA/Diverger 24 gets the offset from the jump instruction. At step 214, the PC is changed by the size of the offset.

At step 216, if the current instruction is a call, the following operations are performed. At step 218, the Diverger 24 gets the offset of the subroutine entry point from the call instruction. At step 220, a new leaf 126 is created by allocating memory for it in the Treestack 26. At step 222, the previous PC pointer 110 for the new leaf 126 is set equal to the PC value of the calling instruction and, at step 224, the PC value 106 for the new leaf 126 is set to the PC value of the subroutine entry point. At step 226, the new leaf 126 is activated by setting its flag 102. The unary element 120 which generated the call instruction is deactivated by resetting its flag 102 and setting its "next PC" pointer 104 equal to the PC value of the entry point of the subroutine. The entire sequence of steps 216 through 226 has transformed a leaf 126 into an internal unary element 124. This is equivalent to a stack 'push' operation.

At step 228, if the instruction is a conditional, branch, the following operations are performed to split a single leaf 126 into a binary element 122 with two leaves 126. At step 230, when the current instruction, as decoded by the instruction decoder 25, is a conditional branch, the leaf 126 is replaced with a binary element 122, retaining the previous values for the label 116 and "previous PC" value 118. The branch destination values, corresponding to the first instruction following the branch instruction (i.e. the branch-not-take-path) and the first instruction in the branch-taken-path, are stored in B1 112 and B2 114, respectively.

At step 232, the offset value of the branch operation is determined from the instruction. At step 234, a first leaf 126 is created for the branch-not-taken path. This leaf has as its label 108, and its PC value 106, the PC of the instruction immediately following the branch. The "previous PC" value of this leaf is the PC for the leaf which was replaced by the binary element 122. The new first leaf is activated.

At step 236, a second leaf 126 is created for the branch-taken path. This leaf has as its label 108, and its PC value 106, the PC of the instruction which follows the branch instruction by the offset value specified in the branch instruction. The "previous PC" value of this leaf is the PC for the leaf which was replaced by the binary element 122. The new second leaf is activated.

At step 238, the DMA/Diverger accommodates return instructions. Modelling return instructions in this exemplary embodiment of the invention is more complex than in a system where conditional branches are not anticipated. If the DMA/Diverger took no action for conditional branches, nested call instructions could be adequately modelled with a simple stack structure, in which each call instruction causes a stack 'push,' and each return causes a stack 'pop.'

In the exemplary embodiment of the invention, however, when the DMA/Diverger 24 encounters a return instruction in one path following a branch instruction, it cannot pop the last previous call entry off of the top of the stack, as it could if there were no branch entries. The DMA/Diverger 24 must continue modelling the other path of the branch entry until a message is received from the Filter Cache to indicate which branch was actually executed by the CPU 2. In this embodiment of the invention, the model supports conditional branch instructions whose limbs may recombine, without creating circular paths in the Treestack.

In the exemplary embodiment of the invention, a single method is used to model return instructions, whether the return is from a single threaded subroutine, or the return follows a branch instruction within the subroutine.

At step 240, upon encountering the return instruction, the DMA/Diverger 24 finds the first internal unary element 124 antecedent (closer to the root of the Treestack 26) to the return instruction. This unary antecedent 124 corresponds to the call instruction which invoked the subroutine, regardless of the nun%her of binary elements 122 (branch instructions) within the current subroutine. At step 242, a copy of the unary antecedent 124 is created.

At step 244, the copy is placed in the Treestack at a location superior (further from the root) to the current leaf. To accomplish this, the "next PC" value 104 for the copy is reset to zero, making the copy into a new leaf 126. The "next PC" value 104 of the current leaf is set to the PC value of the new leaf 126. The "previous PC" value of the new leaf is incremented from its retained value the copy and, so, points back to the first instruction after the call instruction which invoked the subroutine. At step 246, the new leaf 126 is activated by setting its flag, and the current leaf is deactivated by resetting its flag. The current leaf has been transformed into an inactive internal unary element 124.

By handling the return instruction as described in steps 240 through 246, the leaf element where the return instruction was encountered points back to the calling routine. If a return is encountered on the other path of the branch entry, another new leaf 126 will be created, also pointing back to the calling routine. The Treestack 26 therefore may have branch entries which recombine, but no circular paths are created by these operations. This method maintains the "superior tree" and "path to root" sequencing relationships within the Treestack 26.

At step 248, the DMA/Diverger identifies when an indirect instruction is encountered. The response of the CPU 2 to an indirect instruction is not modelled in the exemplary embodiment of the invention, so in this case, the leaf 126 is deactivated.

The final major component of the Code Pump 20 is the Converger 22. The function of the Converger is to delete elements from the Treestack 26 which are no longer required, to make space available for modelling more instructions.

As noted in the discussion of how the DMA/Diverger 24 handles the return instruction, the Treestack is structured to maintain the relationships of superior path and path to root. These relationships are critical for the method which the Converger 22 uses to release unused space in the Treestack 26.

Figure 6:
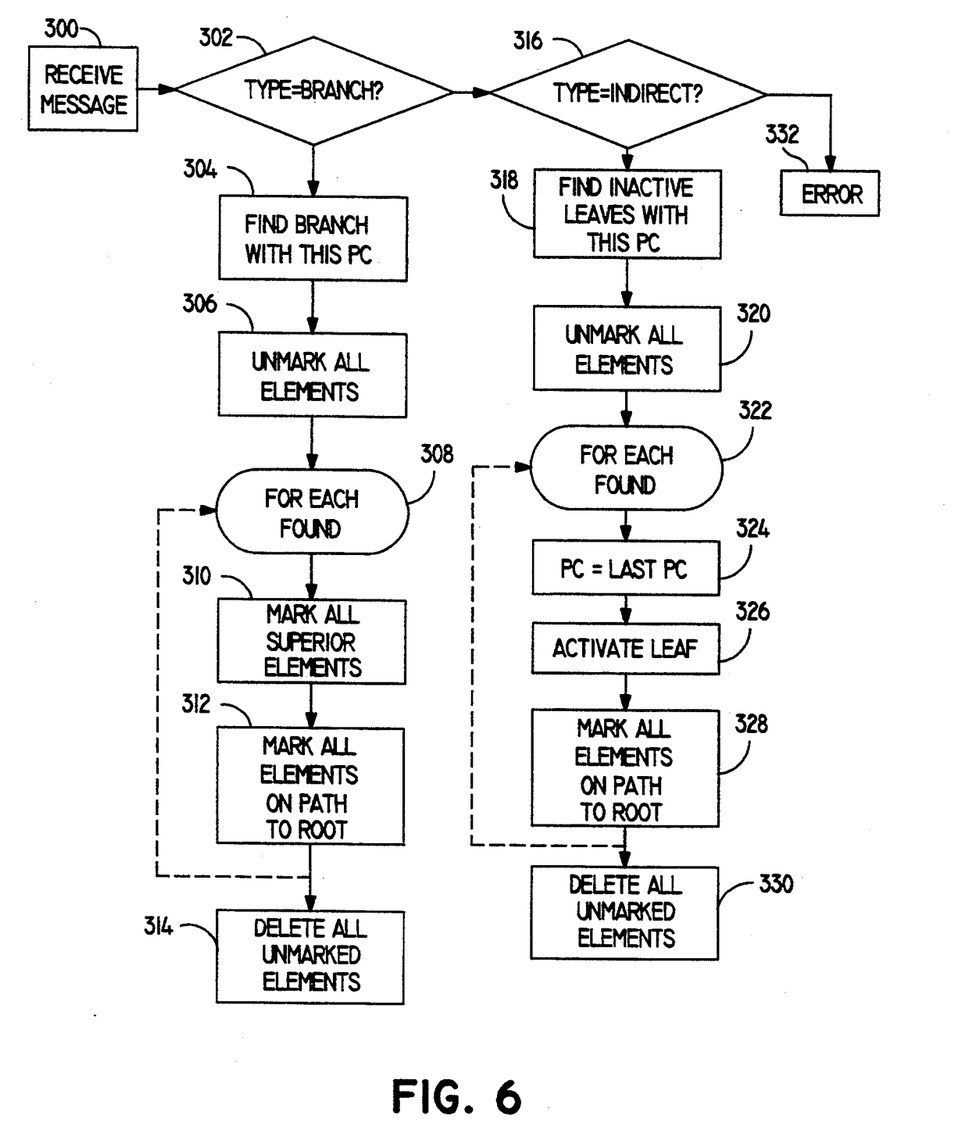
FIG. 6 is a flow diagram showing the functions performed by the Converger shown in FIG. 2.

FIG. 6 shows how Converger 22 processes incoming messages from Filter Cache 10, and uses them to remove unneeded branch entries from the Treestack 26.

At step 302, the Converger determines that a branch instruction has been executed. At step 304, it finds all binary elements within the Treestack 26 having a destination label 112 or 114 which matches the PC of the instruction which the CPU 2 has executed. At step 306, all Treestack elements are unmarked by resetting a mark flag 103.

The converger repeats the following procedure in steps 310 and 312, for each entry in the Treestack 26 a label which matches the address of the returned branch instruction. At step 310, all superior elements (further from root) along the branch executed (i.e., B1 112 and subsequent, or B2 114 and subsequent) are marked for retention, by setting the mark flag 103. This corresponds to regrowing the Treestack superior to the branch entry, on the path taken. At step 312, all elements on the path from the matching branch entry back to root are also marked by setting the flag. This ensures that any pending call entries prior to the branch entry are retained until the corresponding return instructions are encountered.

When all found paths have been marked, all elements which were not marked for retention in step 310 or step 312 are deleted from the Treestack 26 at step 314.

As described above with reference to FIG. 5, when a return instruction is encountered after a branch instruction, the Treestack entry for the call instruction which invoked the subroutine is copied and made superior to the return entry, but its "previous PC" entry is retained. This step effectively removes all entries from the original subroutine call to the branch as antecedents of the return instruction. Consequently, when the Converger 22 receives a message indicating that a branch instruction after the return instruction has been executed, these removed entries are not marked for retention in the treestack and so are removed from the root-path of the branch which follows the return instruction.

Although the present invention does not anticipate the outcome of indirect instructions, it is able to continue modelling the execution state of the CPU 2, after the execution of the indirect instruction. This is handled through the actions of the Converger 22 in response to indirect instruction messages from the Filter Cache 10. The These messages provide two PC values. The first value is the PC of the indirect instruction. The second is the PC of the instruction executed after the indirect instruction. These two values provide the Converger 22 with all of the information it needs to model the unbroken execution path of the CPU 2.

At step 316, Converger 22 determines that the CPU has executed an indirect instruction. At step 318, the Converger finds all of the inactive leaves 126 in the Treestack 26 which have labels 108 that match the first PC value in the message. These leaves correspond to the point in the program execution when modelling stops, because the next instruction cannot be predicted a priori. At step 320, all Treestack 26 elements are unmarked by resetting a flag.

At step 322, the Converger repeats steps 324 through 328, for each inactive leaf 126 found whose label 108 matches the first PC identified in the message. At step 324, the PC value 106 of the found leaf 126 is set to the second PC in the message received from the Filter Cache 10. Since the next instruction executed is now known, modelling of the set of possible CPU 2 execution states can resume for this leaf 126. Therefore, at step 326, the leaf is reactivated. At step 328, all elements 120, 122 on the path to root from the newly reactivated leaf 126 are marked, since this is now known to be the valid execution path of the CPU 2. By definition, there is no superior tree for a leaf 126. At step 330 all unmarked elements are deleted.

The exemplary embodiment of the invention described above employs simple logic within the Converger 22. Improvements to the efficiency of the Converger can be made, at the expense of adding more complex logic. By freeing up additional space in the Treestack, improvements to the Converger would allow more instructions to be anticipated with a fixed Treestack size. For example, where an incoming branch message matches multiple binary elements 122 in the Treestack 26, multiple simultaneous paths to root are possible. The Converger can be modified to delete a binary element 122 which is not required to join two converging paths to root.

It is understood by one skilled in the art that many variations of the embodiments described herein are contemplated. These include different Treestack 26 sizes, and more efficient (but more complex) Converger 22 logic. While the invention has been described in terms of an exemplary embodiment, it is contemplated that it may be practiced as outlined above with modifications within the spirit and scope of the appended claims.

The invention claimed is:

1. In a computer system including a central processing unit (CPU) and a program memory wherein the CPU experiences a latency delay between requesting an instruction from the program memory and receiving the requested instruction, apparatus which reduces the latency delay comprising:

instruction preprocessor means, located in proximity to the program memory, for fetching instructions for a program running on the CPU from the program memory and for providing the instructions to the CPU without any CPU driven pre-fetching, said preprocessor means comprising:

instruction decoder means for assigning a type value to each of the instructions fetched from the program memory;

instruction path diverger means, responsive to the type value provided by the instruction decoder means, for detecting all instructions which indicate a possible change in an execution sequence of the program and for causing the preprocessor to concurrently provide instructions from execution sequences determined from the detected instructions, the instruction path diverger means comprising:

branch handling means, for detecting a conditional branch instruction and for identifying a pair of next instructions, of which pair the CPU requests one next instruction following the conditional branch instruction, and call handling means, for detecting a call instruction, and for identifying a further instruction which the CPU executes after the CPU executes a return instruction that follows the call instruction;

storage means coupled to the branch handling means and call handling means for storing a plurality of indicators, the indicators identifying any of the conditional branch instruction, the pair of next instructions, the call instruction and the further instruction, that are detected by either one of the branch handling means and the call handling means; and memory access control means coupled to the storage means and the program memory for fetching from the program memory a plurality of instruction streams, and for transmitting the plurality of instruction streams without waiting to receive a request from the CPU, the plurality of instruction streams including any of the conditional branch instruction, the pair of next instructions, the call instruction and the further instruction that are identified by the indicators in the storage means; and means, responsive to instruction requests from the CPU, for selecting and providing the requested instructions to the CPU from among the instruction streams transmitted by the preprocessor means.

2. Apparatus according to claim 1, wherein the instruction preprocessor means further comprises instruction path converger means, coupled to the storage means and coupled to receive data values from the CPU, for determining which instruction streams were requested and for removing from the storage means any of the plurality of indicators that identify instructions from any instruction streams which were not requested, thereby to discontinue providing instructions from said instruction streams which were not requested.

3. Apparatus according to claim 2 further comprising: cache filter means, coupled to the CPU and to the preprocessor means and located in proximity to the CPU, including:

buffer means for receiving and holding instructions received from the preprocessor means for selection by the selection means; and means for sending messages to the preprocessor means indicating which instructions have been requested, wherein the selecting means is included in the cache filter means.

4. Apparatus according to claim 3 wherein:

each instruction has a unique address in the program memory and the preprocessor means provides the respective instruction address from the program memory with each instruction provided to the CPU;

the CPU requests each instruction using the address of the instruction in the program memory; and the selecting means compares the instruction address of each instruction provided by the preprocessor means with the address of the requested instruction from the CPU to determine if the instruction is the requested instruction.

5. Apparatus according to claim 4, wherein the storage means includes a program flow data structure, and the program flow data structure includes multiple stack data structures, each representing a respectively different call instruction combined with multiple tree data structures each representing a respectively different conditional branch instruction.

6. Apparatus according to claim 3, further comprising an additional cache memory coupled to the CPU for receiving and storing recently executed instructions that the cache filter means provide to the CPU.

7. Apparatus according to claim 1 further comprising:
cache filter means, coupled to the CPU and to the preprocessor means and located in proximity to the CPU, including buffer means for receiving and holding instructions received from the preprocessor means, wherein the selecting means is included in the cache filter means, and the selecting means selects instructions from among the instructions in the buffer means.

8. In a computer system including a central processing unit (CPU) and a program memory wherein the CPU experiences a latency delay between requesting an instruction from the program memory and receiving the requested instruction, a method for reducing the latency delay comprising:
fetching instructions for a program running on the CPU from the program memory;
assigning a type value to each of the instructions fetched from the program memory;
detecting a branch instruction and a call instruction which indicate a possible change in an execution sequence of the program based on the type value;
identifying a pair of next instructions, of which pair the CPU requests one next instruction following detection of the branch instruction, and
identifying a further instruction which the CPU executes after the CPU executes a return instruction that follows the call instruction;
storing a plurality of indicators identifying any of the pair of next instructions, the call instruction and the further instruction that are detected into a storage medium proximate to the program memory;
fetching from the program memory a plurality of instruction streams without any CPU driven prefetching, the plurality of instruction streams including any of the branch instruction, the pair of next instructions, the call instruction and the further instruction that are identified by the indicators in the storage medium;
transmitting the fetched instruction streams without having the program memory wait to receive a request from the CPU;
selecting and providing the requested instruction to the CPU from among the instruction streams transmitted by the preprocessor in response to the instruction request from the CPU.

9. A method according to claim 8, wherein the selecting step includes:
receiving and holding the instructions transmitted from the program memory in a buffer located in proximity to the CPU; and
selecting and providing the requested instructions to the CPU from among the instructions received by the buffer.

10. A method according to claim 9, further comprising:
communicating instruction identifiers for instructions executed by the CPU;
determining, from the communicated instruction identifiers, which execution sequences in the program were followed; and
removing from the storage medium any of the plurality of indicators that identify instructions from any instruction streams which were not requested, thereby discontinuing the provision of instructions from the program memory for execution sequences which were not chosen.

11. A method according to claim 8, further comprising:
communicating instruction identifiers for instructions executed by the CPU;
determining, from the communicated instruction identifiers, which execution sequences in the program were followed; and
removing from the storage medium any of the plurality of indicators that identify instructions from any instruction streams which were not requested, thereby discontinuing the provision of instructions from the program memory for execution sequences which were not chosen.

12. A method according to claim 11, further comprising storing recently executed instructions in a cache memory that were provided to the CPU from the buffer.

* * * * *